US012673791B2

(12) United States Patent
Smith et al.

(10) Patent No.: US 12,673,791 B2
(45) Date of Patent: Jul. 7, 2026

(54) DRONE POD FOR RECEIVING, STORING, AND PRESENTING A DRONE

(71) Applicant: Axon Enterprise, Inc., Scottsdale, AZ (US)

(72) Inventors: Patrick Smith, Scottsdale, AZ (US); Hans Moritz, Scottsdale, AZ (US); Mark Eastwood, Scottsdale, AZ (US); Brian Fairbanks, Scottsdale, AZ (US); Nathan Patulski, Scottsdale, AZ (US); Matthew Carver, Cave Creek, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 0 days.

(21) Appl. No.: 19/185,094

(22) Filed: Apr. 21, 2025

(65) Prior Publication Data

US 2025/0242951 A1     Jul. 31, 2025

Related U.S. Application Data

(62) Division of application No. 17/769,478, filed as application No. PCT/US2020/055812 on Oct. 15, 2020, now Pat. No. 12,280,901.

(Continued)

(51) Int. Cl.
*B64U 70/93*     (2023.01)
*B64U 10/14*     (2023.01)
(Continued)

(52) U.S. Cl.
CPC ............. *B64U 70/93* (2023.01); *B64U 70/95* (2023.01); *B64U 80/10* (2023.01); *B64U 80/70* (2023.01); *B64U 80/80* (2023.01); *B64U 10/14* (2023.01)

(58) Field of Classification Search
CPC ......... B64U 70/93; B64U 80/10; B64U 70/95
See application file for complete search history.

(56) References Cited

U.S. PATENT DOCUMENTS 9,764,836 B1 *   9/2017   Elzinga ................. B64U 80/70
10,467,685 B1 *  11/2019  Brisson ............... G06Q 10/083
(Continued)

FOREIGN PATENT DOCUMENTS

CA           3125408 A1 *  10/2021  ............. B64U 70/30
CN       106218911 A  *  12/2016  ............. B64F 1/007
(Continued)

OTHER PUBLICATIONS

Korean Intellectual Property Office, International Search Report for International Application No. PCT/ US2020/055812 mailed Jan. 13, 2021.

(Continued)

*Primary Examiner* — Christopher P Ellis
(74) *Attorney, Agent, or Firm* — H S. Malvich, Jr.; Andrew Graham

(57)               ABSTRACT

A drone pod may receive, stow, and launch a drone. The drone pod may include a housing, a canopy movably coupled to the housing, a platform movably coupled to the housing, and a drone bay. The drone pod may be configured to move the canopy to expose the drone bay and raise the platform relative to a floor of the drone bay to receive the drone, lower the platform toward the floor of the drone bay and move the canopy to enclose the drone bay to stow the drone, move the canopy to expose the drone bay and raise the platform relative to the floor of the drone bay to launch the drone. The drone pod may be mounted on a vehicle. A system may include a drone pod and a drone, wherein the drone pod is configured to receive, stow, and launch the drone.

20 Claims, 2 Drawing Sheets

Related U.S. Application Data

(60) Provisional application No. 62/915,261, filed on Oct. 15, 2019.

(51) Int. Cl.

| | |
|---|---|
| *B64U 70/95* | (2023.01) |
| *B64U 80/10* | (2023.01) |
| *B64U 80/70* | (2023.01) |
| *B64U 80/80* | (2023.01) |

(56) References Cited

U.S. PATENT DOCUMENTS

| | | | | |
|---|---|---|---|---|
| 11,079,752 | B1 * | 8/2021 | Lombardini | F41H 13/0018 |
| 11,111,033 | B1 * | 9/2021 | Burks | B64U 50/19 |
| 11,148,805 | B2 * | 10/2021 | Cooper | B64U 70/97 |
| 12,280,901 | B2 * | 4/2025 | Smith | B64F 1/005 |
| 12,330,811 | B2 * | 6/2025 | Fisher | B64U 70/80 |
| 12,391,414 | B2 * | 8/2025 | Qiu | B64U 80/70 |
| 2016/0334785 | A1 * | 11/2016 | Morrison | A63H 30/04 |
| 2017/0225799 | A1 * | 8/2017 | Selwyn | B64F 1/005 |
| 2017/0225801 | A1 * | 8/2017 | Bennett | B64U 70/90 |
| 2018/0092484 | A1 * | 4/2018 | Lewis | G08G 5/54 |
| 2018/0141680 | A1 * | 5/2018 | Heinonen | B60L 53/80 |
| 2018/0148170 | A1 * | 5/2018 | Stamatovski | B64U 80/25 |
| 2018/0212446 | A1 * | 7/2018 | Cheng | H02J 7/731 |
| 2018/0245365 | A1 | 8/2018 | Wankewycz | |
| 2018/0327091 | A1 * | 11/2018 | Burks | B64U 50/13 |
| 2019/0100330 | A1 * | 4/2019 | Cheng | B64U 80/25 |
| 2019/0308724 | A1 * | 10/2019 | Cooper | B64U 80/25 |
| 2019/0315463 | A1 * | 10/2019 | Chen | F24H 15/25 |
| 2020/0239135 | A1 * | 7/2020 | Cheng | B64U 70/92 |
| 2021/0269174 | A1 * | 9/2021 | Shuff | B60L 58/24 |
| 2021/0276735 | A1 * | 9/2021 | Raptopoulos | A47G 29/141 |
| 2022/0380063 | A1 * | 12/2022 | Shah | B64U 70/92 |
| 2023/0167653 | A1 * | 6/2023 | Waters | B64U 80/25 244/114 R |
| 2023/0202682 | A1 * | 6/2023 | Kiyokami | B64U 70/90 244/114 R |
| 2023/0348106 | A1 * | 11/2023 | Berthelet | B64U 70/97 |
| 2023/0373668 | A1 * | 11/2023 | Kozlenko | G05D 1/0055 |
| 2024/0140630 | A1 * | 5/2024 | Lee | B64U 80/40 |

FOREIGN PATENT DOCUMENTS

| | | | | | |
|---|---|---|---|---|---|
| CN | 113148211 | A | * | 7/2021 | B64U 80/70 |
| CN | 217326689 | A | | 8/2022 | |
| CN | 217326689 | U | * | 8/2022 | |
| CN | 116902262 | A | * | 10/2023 | B64U 80/70 |
| EP | 3819215 | A1 | * | 5/2021 | B64U 80/25 |
| GB | 2559580 | A | * | 8/2018 | B64U 70/99 |
| JP | 2017527479 | A | | 9/2017 | |
| KR | 101703458 | B1 | * | 2/2017 | B64F 1/025 |
| KR | 1020170017517 | A | | 2/2017 | |
| KR | 1020190018247 | A | | 2/2019 | |
| KR | 20190103091 | A | * | 9/2019 | B64F 1/222 |
| KR | 1020190103091 | A | | 9/2019 | |
| KR | 102143497 | B1 | * | 8/2020 | B64U 30/20 |
| KR | 102176777 | B1 | * | 12/2020 | B64U 80/70 |
| KR | 20210149923 | A | * | 12/2021 | B64U 20/87 |
| KR | 20230132228 | A | * | 9/2023 | B64D 1/02 |
| KR | 102613926 | B1 | * | 12/2023 | G01C 25/00 |
| WO | 2017075907 | A1 | | 5/2017 | |
| WO | WO-2018139723 | A1 | * | 8/2018 | B64F 1/22 |
| WO | 2020154191 | A3 | | 7/2020 | |
| WO | WO-2021082794 | A1 | * | 5/2021 | B64U 80/70 |
| WO | WO-2022045459 | A1 | * | 3/2022 | B64U 50/37 |

OTHER PUBLICATIONS

The International Bureau of Wipo, Notification Concerning Transmittal of Copy of International Preliminary Report on Patentability for International Application No. PCT/US20/55812 mailed Apr. 28, 2022.

* cited by examiner

DRONE POD FOR RECEIVING, STORING, AND PRESENTING A DRONE

FIELD OF THE INVENTION

Embodiments of the present invention relate to a drone pod for receiving, storing, and presenting a drone

BRIEF DESCRIPTION OF THE DRAWINGS

To allow for a more complete understanding of the present invention, it will now be described by way of example, with reference to the accompanying drawings in which.

Figure 1:
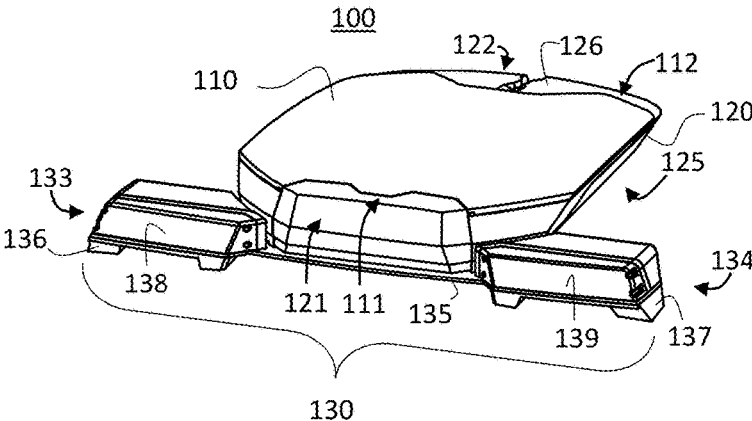
FIG. 1 illustrates a perspective view of a drone pod in accordance with various embodiments disclosed herein.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Unmanned aerial vehicles (e.g., drones, UAVs, quadcopters, etc.) are used in many situations such as photography, oil exploration, disaster relief, and product delivery. Security agencies (e.g., police, fire, private) may use drones to perform surveillance. A drone may be used by security personnel (e.g., officers, agents, police officers, etc.) to surveil the position, activities, and movements of a suspect. A drone may carry a camera (e.g., still, video, etc.) to surveil a suspect. Data from the camera may be used to aid autonomous movement of the drone.

A drone may communicate with a server via a network. For example, a drone may establish wireless communication with one or more base stations of a network (e.g., cellular 3G, LTE, 5G, etc.). The drone may communicate wirelessly with a base station. The base station may include a mobile base station, such as a vehicle. The base station may communicate with a server via one or more other networks. A drone may communicate (e.g., transmit, receive, etc.) data via the wireless connection with a base station. Data transmitted by a drone may originate in the drone (e.g., photographic data, video data, audio data, GPS data, drone status data). Data communicated by a drone may be received from or transmitted to a communication device used by an officer.

Systems, methods, and apparatuses may be used to receive, store, and present one or more drones. For example, a drone pod may be used to receive (e.g., accept) a drone, store (e.g., stow) a drone, and present (e.g., launch) a drone. The drone pod may provide a platform on which the drone may be received and/or presented and a drone bay in which the drone may be stored. The drone pod may be mounted to an exterior surface of a vehicle (e.g., roof, hood, trunk lid, etc.). The vehicle may include land, sea, and air vehicles. Land vehicles may include a patrol car, a pick-up truck, and an SUV.

The drone pod may comprise a housing, a drone bay, and a canopy, wherein the canopy is configured to expose (e.g., uncover) and enclose (e.g., cover) the drone bay. In a first, closed position, the canopy may cover the drone bay to protect a drone present in the bay from environmental factors external to the drone bay. In a first, closed position, the canopy may cover the drone bay to stow the drone for transport by a vehicle. In a second, open position, the canopy may expose the drone bay to receive an incoming (e.g., landing) drone. In a second, open position, the canopy may expose the drone bay to present an outgoing (e.g., launching) drone.

To improve the versatility of a drone pod, it may be desirable to minimize a height of a drone pod (e.g., the distance between a top of a drone pod and a surface to which the drone pod may be mounted). Minimizing the height of a drone pod may enable the drone pod to be mounted on a greater variety of vehicles, and/or reduce an aerodynamic resistance of the drone pod. The height of a drone pod may be minimized by minimizing the height of various components of the drone pod. To improve the versatility of a drone pod, it may also be desirable for a drone pod mounted on a vehicle to incorporate one or more light bars for providing visible and/or audible indicia.

To improve the safety of a drone pod, it may be desirable for a drone pod to include features to prevent damage to an incoming drone, an outgoing drone, or a stored drone. The drone pod may include locators to assist in locating the drone relative to the drone bay. The locators may increase a likelihood of safely landing a drone in the drone bay. The locators may increase the likelihood of safely securing the drone in the drone bay. The locators may increase the likelihood of safely launching a drone from the drone bay. The drone bay may further include a moveable platform configured to raise and lower to minimize a likelihood of collision between a drone and physical structures (e.g., sides, ends, walls, etc.) of the drone bay.

Embodiments according to various aspects of the present disclosure address various issues, including one or more of the problems highlighted above. Embodiments according to various aspects of the present disclosure further provide various improvements, including the one or more benefits of versatility and safety discussed above.

In various embodiments, a drone pod for receiving, storing, and presenting is provided. The drone pod may comprise a housing configured to house a provided drone in a drone bay, wherein a moveable canopy is configured to move to expose and enclose the drone bay. The canopy and the housing may each comprise an aerodynamic shape and/or aerodynamic features. The shape of the canopy and the housing may complement one another. The drone pod may comprise a first actuator configured to mechanically assist movement of the canopy relative to the housing. The first actuator may be passive or powered by a power source. The first actuator may assist in exposing and enclosing a drone bay of the housing. The first actuator may movably couple the canopy to the housing. The first actuator may move the canopy about a range of motion between a first position and a second position. Actuating the first actuator may cause the canopy to move to a first position (e.g., open position), wherein the drone bay is exposed. Actuating the first actuator may cause the canopy to move to a first position, wherein the drone pod may be configured to receive and/or present a drone. Actuating the first actuator may cause the canopy to move to a second position (e.g., closed position), wherein the drone bay is enclosed by the canopy. Actuating the first actuator may cause the canopy to move to a second position, wherein the drone pod may store a drone. Actuating the first actuator may cause the canopy to move to a second position, wherein the drone pod protects the drone from external environmental factors. External environmental factors may include naturally occurring factors such as wind, rain, smoke, salt spray, etc. External environmental factors may include human-made factors, such as gunfire, spray paint, physical abuse, etc.

The first actuator may include a mechanical actuator, an electromechanical actuator, a pneumatic actuator, and/or a hydraulic actuator. For example, the first actuator may comprise a mechanical actuator such as a rack and pinion actuator. The canopy may include a gear rack longitudinally extending across an inner surface of the canopy. The housing may include a pinion for driving the gear rack of the canopy. The pinion may be positioned distal to a fore end of the housing. The housing may further comprise a gear rack channel longitudinally extending from an aft end of the housing and terminating proximal to the pinion of the housing. The gear rack channel of the housing may provide a recess for the gear rack of the canopy to move within, such that the inner surface of the canopy may closely engage an outer surface of the housing. The gear rack of the canopy may mesh with the pinion of the housing. Rotation of the pinion in a first direction may cause the canopy to move relative to the housing in a first direction to expose the drone bay of the housing. Rotation of the pinion in a second direction may cause the canopy to move relative to the housing in a second direction to enclose the drone bay of the housing. Rotation of the pinion in the first direction may cause the canopy to move toward the aft of the housing. Rotation of the pinion in the second direction may cause the canopy to move toward the fore end of the housing.

In various embodiments, a drone pod for receiving, storing, and presenting a drone may comprise a window disposed at a fore end of the housing and contiguous with a drone bay of the housing. The window may be transmissive in various wavelengths of electromagnetic radiation to enable a sensor present within the drone bay of the housing to communicate with an environment external to the housing. For example, a drone may include an image sensor such as a visible light sensor, and/or an infrared sensor. It may be desirable to utilize the sensor of the drone when the drone is stored (e.g., present) in the drone bay of the drone pod. The window may be partially transmissive in wavelength ranges such as between eight microns and fifteen microns, thereby enabling a long-wavelength infrared sensor present in the drone bay of the housing to communicate with long-wavelength infrared radiation external to the housing. The window may communicatively couple the drone bay to a portion of visible and/or infrared radiation external to the housing.

In various embodiments, a drone pod for receiving, storing, and presenting a drone may comprise a base disposed at a fore end of a housing. The base may comprise one or more feet for supporting a weight of the drone pod. The base may comprise one or more feet for mounting to a surface, such as a roof of a vehicle. The base may comprise one or more light bars. The light bars may provide indicia such as visible lights and audible sirens. The one or more light bars may receive power from a power source.

In various embodiments, a drone pod for receiving, storing, and presenting a drone may comprise a platform recessed within a drone bay of a housing for receiving, storing, and presenting a drone. The platform may include one or more locators for locating the drone to the platform. The locators of the platform may engage with the drone to assist in receiving, storing, and/or presenting the drone. The platform may be moveably coupled to a floor of the drone bay. The drone pod may include a second actuator for actuating the platform with respect to the housing. The second actuator may be passive or powered by a power source. The second actuator may be configured to raise the platform relative to a floor of the drone bay, thereby decreasing a risk of collision between a drone and walls of the drone bay. The second actuator may be configured to raise the platform relative to a floor of the drone bay, thereby increasing a clearance between a drone and walls of the drone bay. The platform may be raised relative to the housing to receive an incoming (e.g., landing) drone and/or present an outgoing (e.g., launching) drone. The second actuator may be configured to lower the platform into the drone bay to store a drone within the drone bay.

In embodiments, a range of motion associated with the second actuator may be one or more of non-parallel or perpendicular to a range of motion associated with a first actuator coupled to a canopy of the drone pod. A first direction associated with a range of motion provided for the canopy by the first actuator may be different from a second direction associated with a range of motion provided for the platform by the second actuator. For example, the first actuator may move the canopy in a lateral direction, while the second actuator may move the platform in a vertical direction. The vertical direction may be perpendicular to the lateral direction.

In various embodiments, a drone pod for receiving, storing, and presenting a drone may comprise a first positional sensor. The first positional sensor may detect a position of a canopy relative to a housing. For example, the first positional sensor may detect whether the canopy is in an open position and/or a closed position. The first positional sensor may prevent and/or enable movement of the canopy relative to the housing. The first positional sensor may receive power from a power source. The first positional sensor may provide positional information to a control interface.

The drone pod may further comprise a second positional sensor. The second positional sensor may detect a position of a platform relative to the housing. The second positional sensor may detect whether the platform is in a raised position and/or a closed position. The second positional sensor may prevent and/or enable movement of the platform relative to the drone bay of the housing. The second positional sensor may receive power from a power source. The second positional sensor may provide positional information to a control interface.

In various embodiments, a drone pod for receiving, storing, and presenting may comprise a control interface. The control interface may be locally located on a housing. The control interface may be remotely located from a housing. The control interface may receive power from a power source. The control interface may control actuation of one or more actuators. The control interface may control movement of a canopy relative to the housing. The control interface may control movement of a platform relative to the housing. The control interface may receive positional information from one or more positional sensors. The control interface may enable and/or prevent movement of the canopy relative to the housing based on positional information received by the one or more positional sensors. The control interface may enable and/or prevent movement of the platform relative to the housing based on positional information received by the one or more positional sensors. The control interface may comprise one or more of a mechanical interface, an electronic interface, and an electromechanical interface. The control interface may include one or more inputs and/or one or more outputs. For example, the control interface may include switches, knobs, dials, touchscreens, safety interlocks, biometric readers, and the like.

In various embodiments, a drone pod for receiving, storing, and presenting may comprise a wiring harness. A wiring harness may electrically couple one or more components of the drone pod. The wiring harness may be electrically coupled with a power source. The wiring harness may electrically couple one or more components of the drone pod to the power source. For example, the wiring harness may provide power to a light bar, positional sensors, actuators, and/or control interface. The wiring harness may be coupled with a portion of a vehicle wiring harness.

In various embodiments, a drone pod for receiving, storing, and presenting may comprise a power source. A power source may provide power to one or more components of the drone pod, such as a control interface, a first actuator, a second actuator, a sensor, a light bar, a drone, or any combination thereof. The power source may be removable, rechargeable renewable or any combination thereof. For example, the power source may include a removable battery, a rechargeable battery, a vehicle battery, a generator, and/or a photovoltaic array.

In various embodiments, a drone pod for receiving, storing, and presenting may further comprise one or more aerodynamic features. The one or more aerodynamic features may reduce aerodynamic resistance, improve stability, and/or provide a downward force on a canopy. The one or more aerodynamic features may assist in deflecting external environmental factors away from the housing. The one or more aerodynamic features may provide a downward force on a canopy in a closed position to prevent the canopy from disengaging the housing in the closed position.

In various embodiments and with reference to FIG. 1, a drone pod 100 for receiving, storing, and providing a drone is disclosed. Drone pod 100 may be similar to, or have similar aspects and/or components with, the drone pods for receiving, storing, and presenting a drone previously discussed herein. It should be understood by one skilled in the art that FIG. 1 is an example illustration of drone pod 100, and one or more of the components of drone pod 100 may be located in any suitable position within, or external to, drone pod 100. In the example of FIG. 1, drone pod 100 may comprise a canopy (e.g., shield, cover, etc.) such as canopy 110, a housing (e.g., pod, container, body, etc.), such as housing 120, and a base (e.g., beam, support, etc.) such as base 130.

Canopy 110 may be configured to movably engage housing 120 of drone pod 100. Canopy 110 may comprise a curvature that complements a curvature of housing 120. Canopy 110 may have a broad, concave, but mainly flat shape. The concave shape of canopy 110 may be defined in outward direction toward canopy 110 from a drone bay inside drone pod 100. The shape of canopy 110 may extend from a proximal end 111 of canopy 110 to a distal end 112 of canopy 110 opposite the proximal end 111 of canopy 110. A longest dimension of canopy 110 may be a length between proximal end 111 and distal end 112 of canopy 110. The length between proximal end 111 and distal end 112 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. The canopy may be configured to movably engage various components of the housing as discussed further herein.

Housing 120 may be configured to house various components of drone pod 100. A top surface 126 of housing 120 may comprise a shape configured to movably engage canopy 110. The shape of top surface 126 of housing 120 may complement the shape of canopy 110. Housing 120 may extend from a fore end 121 of housing 120 to an aft end 122 of housing 120 opposite the fore end 121 and from a first end 123 of housing 120 to a second end 124 opposite the first end 123. A longest dimension of housing 120 may be a length between fore end 121 and distal end 112 of housing 120. The length between fore end 121 and aft end 122 may be greater than a length of canopy 110. The length between fore end 121 and aft end 122 of housing 120 may be at least eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. Housing 120 may comprise feet for mounting to an external surface of a vehicle as discussed further herein.

Housing 120 may comprise a base 130. Base 130 may be configured to support various components of drone pod 100. Base 130 may be coupled to a bottom surface 125 of housing 120. Base 130 may comprise the shape of a beam that extends perpendicular to the length of housing 120. Base 130 may be disposed at any location on bottom surface 125 of housing 120, such as proximal to fore end 121, proximal to aft end 122, and any location between fore end 121 and aft end 122. The shape of base 130 may longitudinally extend from a first end 133 of base 130 to a second end 134 of base 130 opposite first end 133. A widest dimension of base 130 may be a width between first end 133 and second end 134 of base 130. The width between first end 133 and second end 134 of base 130 may be at least twelve inches (thirty centimeters), eighteen inches (forty-six centimeters), at least twenty-four inches (sixty-one centimeters), at least thirty inches (seventy-six centimeters), at least thirty-six inches (ninety-one centimeters), or at least forty-eight inches (one hundred and twenty-two centimeters) in embodiments according to various aspects of the present disclosure.

In embodiments, housing 120 may have different widths between fore end 121 and aft end 122. The different widths may be disposed among adjacent portions of housing 120, such that housing 120 may have a T-shape in accordance with the different widths. A first width may be wider than a second width of the different widths. The first width may be a width of base 130 between first end 133 and second end 134. The second width may include a portion of housing 120 at which the drone bay is included in housing 120. The second width may be perpendicular to a dimension between fore end 121 and aft end 122, parallel to the first width. The different widths may decrease a size and weight of drone pod 100, while improving aerodynamic properties of drone pod 100 when drone pod 100 is mounted on the roof of a vehicle.

Base 130 may comprise feet configured to support various components of drone pod 100. The feet may extend from a bottom surface 135 of base 130. The feet may be configured to mount to a surface as discussed further herein. Base 130 may include a first foot 136 disposed at the first end 133 of base 130 and a second foot 137 disposed at the second end 134 of base 130.

Base 130 may comprise one or more light bars configured to provide indicia. The indicia may comprise visible indicia (e.g., lights) and/or audible indicia (e.g., sirens). A first light bar housing 138 may be disposed at the first end 133 of base 130 and a second light bar housing 139 may be disposed at the second end 134 of base 130. The first light bar housing 138 and the second light bar housing 139 may each be configured to house various components configured to provide indicia, such as emergency indicia, alert indicia, and/or signaling indicia.

In various embodiments, canopy 110, housing 120, and base 130 may each be formed of one or more rigid, durable materials able to withstand force(s) applied to the drone pod 100 by an external environment. For example, canopy 110, housing 120, and/or base 130 may include one or more rigid, plastic materials, metal materials, and/or composite materials. The one or more rigid materials may include corrosion-resistant materials, UV resistant materials, and/or materials configured to withstand environmental factors. Rigid materials may include metals and metallic alloys (e.g., aluminum, steel, titanium, etc.), composites (e.g., fiberglass, carbon fiber, etc.), and plastics (e.g., PC/ABS, PEEK, etc.). The rigid materials may also be treated (e.g., heat-treated, galvanized, anodized) and/or painted (e.g., powder-coated, e-coated, etc.). One or more components of each of canopy 110, housing 120, and base 130 may comprise the rigid, durable materials in embodiments according to various aspects of the present disclosure.

In various embodiments, a canopy of a drone pod for receiving, storing, and presenting may be disposed in one or more second positions, different from a first position. A second position may include a different relative position between the canopy and a housing of the drone pod. The different relative position may include one or more of a different orientation, different angular position, and different spacing between the canopy and housing in comparison with an orientation, angular position, and spacing between the canopy and housing in a first position of the canopy.

Figure 2:
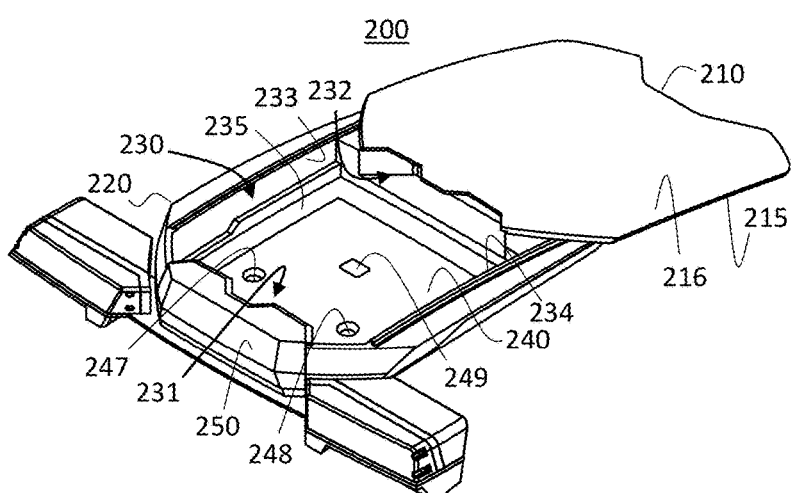
FIG. 2 illustrates a perspective view of a drone pod in accordance with various embodiments disclosed herein.

As illustrated in FIG. 2, a drone pod 200 for receiving, storing, and presenting a drone may include a canopy 210 at a second position relative to a housing 220. The second position of canopy 210 of drone pod 200 is different from a first position for such a canopy, such as a position illustrated for canopy 110 of drone pod 100 (with brief reference to FIG. 1). The second position may be an open (e.g., expanded, unprotected, etc.) position, while a first position may be a closed (e.g., contracted, protected, etc.) position in embodiments according to various aspects of the present disclosure. In embodiments, drone pod 200 may correspond to drone pod 100 of FIG. 1, wherein canopy 210 corresponds to canopy 110 moved to a different, second position relative to housing 120. Movement between the positions may be enabled via one or more elements, such as an actuator, as discussed further herein.

Housing 220 may include one or more surfaces to which a canopy (e.g., canopy 210 or 110 with brief reference to FIG. 1) may be coupled or placed in contact. Exterior surfaces of housing 220 may be complementary in shape to one or more inner surfaces of a canopy (e.g., canopy 210), wherein the one or more inner surfaces include one or more surfaces of the canopy closest to the exterior surfaces of housing 220 in one or more positions of the canopy.

Canopy 210 may include an inner surface 215 and an outer surface 216 opposite the inner surface 215. Inner surface 215 and outer surface 216 may be generally flat, convex, or concave. Inner surface 215 may be parallel with outer surface 215. A thickest dimension of canopy 210 may be a greatest thickness between inner surface 215 and outer surface 216 of canopy 210. The thickness between inner surface 215 and outer surface 216 may be at least 0.03 inches (0.08 centimeters), at least 0.06 inches (0.15 centimeters), at least 0.15 inches (0.38 centimeters), at least 0.30 inches (0.76 centimeters), or at least 0.5 inches (1.27 centimeters) in embodiments according to various aspects of the present disclosure.

Housing 220 may include various elements, including one or more of a drone bay (e.g., chamber, cavity, etc.) such as drone bay 230, a platform 240, and a window 250. In embodiments, each of these elements may be integrally coupled with one or more other elements of housing 220.

Drone bay 230 may be defined by one or more of a first end 231, a second end 232 opposite the first end 231, a first side 233, a second side 234 opposite the first side 233, a floor 235, and an opening defined by the ends and sides of the drone bay. Drone bay 230 may include a broad and thick shape. The shape of drone bay 230 may extend between the first end 231 and the second end 232 and between the first side 233 and the second side 244. The shape of drone bay 230 may have a generally square cross-section, rectangular cross-section, circular cross-section, or polygonal cross-section. A longest dimension of drone bay 230 may be a length between first end 231 and second end 232 of drone bay 230. The length between first end 231 and second end 232 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. A widest dimension of drone bay 230 may be a width between first side 233 and second side 234 of drone bay 230. The width between first side 233 and second side 234 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. A thickest dimension of drone bay 230 may be a clearance between the floor 235 and the inner surface 215 of canopy 210 in a closed position such as a position illustrated for canopy 110 of drone pod 100 (with brief reference to FIG. 1). A clearance between floor 235 and inner surface 215 of canopy 210 in a closed position may be at least two inches (five centimeters), at least four inches (ten centimeters), at least six inches (fifteen centimeters), at least eight inches (twenty centimeters), or at least twelve inches (thirty centimeters) in embodiments according to various aspects of the present disclosure. A volume of drone bay 230 may be a space bounded by first end 231, second end 232, first side 233, second side 234, floor 235, and inner surface 215 of canopy 210 in a closed position. The volume of drone bay 230 may be equal to or greater than the material volume of housing 220.

In various embodiments, drone pod 200 may comprise platform 240 disposed within drone bay 230 of housing 220. Platform 240 may be contiguous with floor 235 of drone bay 230 and fixed. Platform 240 may be movably coupled to housing 220, such that platform 240 may move relative to drone bay 230. Platform 240 may have a broad and mainly flat shape. The shape of platform 240 may extend between a first end and a second end opposite the first end and between a first side and a second side opposite the first side. A longest dimension of platform 240 may be a length between the first end and the second end of platform 240. The length between the first end and the second end of platform 240 may be less than or equal to the length of drone bay 230. A width between the first side and the second side of platform 240 may be less than or equal to the width of drone bay 230. Platform 240 may be formed of one or more rigid, durable materials as previously described herein.

Platform 240 may comprise one or more locators configured to mechanically locate a drone relative to platform 240, and thereby drone bay 230. A locator may apply a physical force between platform 240 and a drone to retain (e.g., resist removal of, prevent motion of, etc.) the drone on platform 240. Locators may include magnets, electromagnets, a hook structure, a loop structure, a chamfered hole, a counterbored hole, a cradle, and the like. An individual locator may comprise one or more of each of a magnet, an electromagnet, a hook structure, a loop structure, a chamfered hole, a counterbored hole, a cradle, and the like. For example, platform 240 may include a first locator 247, a second locator 248, and/or a third locator 249. The first locator 247 and the second locator 248 may be disposed proximal to first end 241 of platform 240. The first locator 247 and the second locator 248 may each comprise a chamfered hole (e.g., blind hole, thru-hole) for mechanically locating a drone relative to platform 240. For example, first locator 247 and second locator 248 of platform 240 may mechanically engage one or more components of a drone (e.g., landing gear, rotor shafts, etc.). Third locator 249 may include a magnet (e.g., electromagnet, permanent magnet, etc.) for magnetically engaging one or more components of a drone (e.g., body, housing, etc.). Third locator 249 may be proximal to a center and/or second end 242 of platform 240. Third locator 249 may be flush or protruding from an upper surface of platform 240.

In various embodiments, drone pod 200 may comprise window 250 disposed at a fore end 221 of housing 220. Window 250 may be contiguous with drone bay 230. A portion of first end 231 of drone bay 230 may include window 250. A portion of a fore end of a housing may include window 250. Window 250 may be formed of a material that provides a transmissive medium for wavelengths of electromagnetic radiation to communicate between drone bay 230 and an environment external to drone bay 230. In various embodiments, window 250 may be formed of a rigid material. For example, window 250 may comprise a rigid material that is visually transmissive (e.g., material that is transmissive in wavelengths perceived by the human eye, such as between 380 nanometers to 740 nanometers) to enable a drone present in the drone bay, such as a visible light camera, to detect visible light through window 250. Window 250 may comprise glass, polycarbonate, and other visually transparent rigid materials. As another example, window 250 may comprise a rigid material that is transmissive in portions of the infrared spectrum, such as portions of the short-wavelength infrared region (one micron to three microns), portions of the mid-wavelength infrared region (three microns to eight microns), portions of the long-wavelength infrared region (eight microns to fifteen microns), portions of the far-infrared region (fifteen microns to one thousand microns) or any combination thereof. Window 250 may comprise an infrared ("IR") transmissive medium such as germanium, silicon, zinc selenide, IR fused silica, sapphire, and the like. Because IR transmissive mediums may be expensive to manufacture, window 250 may comprise a polymer material relatively transmissive in IR wavelengths, such as polyolefin. Window 250 may allow sensors within the drone bay to communicate with radiation external to the drone bay.

In various embodiments, a platform of a drone pod for receiving, storing, and presenting may be disposed in one or more second positions, different from a first position. A second position may include a different relative position between the platform and a drone bay of a housing of the drone pod. The different relative position may include one or more of a different orientation, different angular position, and different spacing between the platform and drone bay in comparison with an orientation, angular position, and spacing between the platform and drone bay in a first position of the platform.

Figure 3:
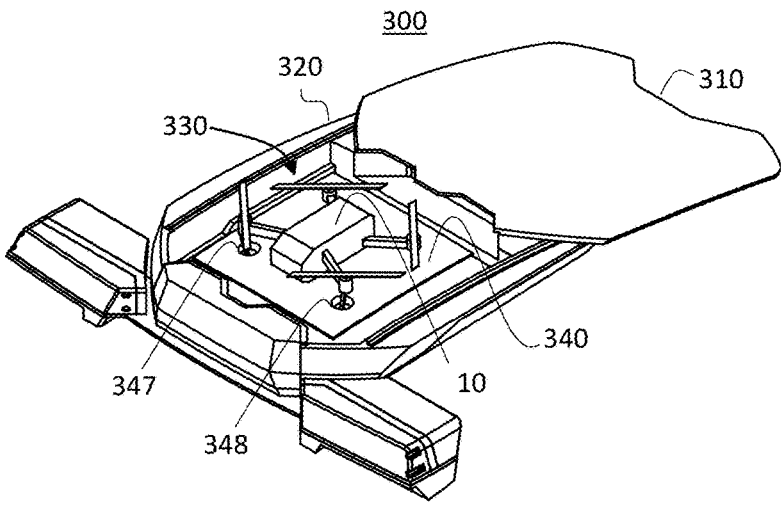
FIG. 3 illustrates a perspective view of a drone pod in accordance with various embodiments disclosed herein.

As illustrated in FIG. 3, a drone pod 300 for receiving, storing, and presenting a drone 10 may include a platform 340 at a second position relative to a housing 320. The second position of platform 340 of drone pod 300 is different from a first position for such a platform, such as a position illustrated for platform 240 of drone pod 200 (with brief reference to FIG. 2). The second position may be a raised or exposed position, while a first position may be a lowered or enclosed position in embodiments according to various aspects of the present disclosure. In embodiments, drone pod 300 may correspond to drone pod 200 of FIG. 2, wherein platform 340 corresponds to platform 240 moved to a different, second position relative to housing 220. Movement between the positions may be enabled via an actuator as discussed further herein.

As illustrated in FIG. 3, a drone pod 300 for receiving, storing, and presenting a drone 10 may include a canopy 310 at a second position relative to the housing 320. The second position of canopy 310 of drone pod 300 is different from a first position for such a canopy, such as a position illustrated for canopy 110 of drone pod 100 (with brief reference to FIG. 1). The second position may be an open (e.g., expanded, unprotected, etc.) position, while a first position may be a closed (e.g., contracted, protected, etc.) position in embodiments according to various aspects of the present disclosure. In embodiments, drone pod 300 may correspond to drone pod 100 of FIG. 1, wherein canopy 310 corresponds to canopy 110 moved to a different, second position relative to housing 120.

In embodiments, drone pod 300 may be in a receiving state and/or presenting state. Drone pod 300 may be configured to receive drone 10 in the receiving state and/or present drone 10 in the presenting state. The receiving state and the presenting state may be the same state. In the receiving and/or presenting state, canopy 310 of drone pod 300 may be disposed in an open position. In accordance with the open position, platform 340 may be exposed (e.g., uncovered, accessible, unobstructed, etc.) such that drone 10 may be presented or received on platform 340 while a minimum, non-zero spacing is maintained between drone 10 and drone pod 300, aside from physical contact made between drone 10 and platform 340. In accordance with the open position of canopy 310, drone 10 may be received on and presented from platform 340 in a physically unimpeded manner. In the receiving state and/or presenting state, platform 340 may alternately or additionally be disposed in a raised position. In accordance with the raised position, a depth to which platform 340 may be disposed in drone bay 330 may be decreased. In the raised position, a spacing between platform 340 and canopy 310 may be decreased relative to a lowered position of platform 340. The spacing between platform 340 and canopy 310 in the raised position may be less than a height of drone 310 in a direction perpendicular from a surface of platform 340 on which drone 10 may be received. In the receiving and/or presenting state, platform 340 may be proximate to canopy 310 in accordance with the raised position, but laterally offset from canopy in accordance with the open position of canopy 310.

Drone pod 300 may be configured to store drone 10 in a storing state. In the storing state, canopy 310 may be disposed in a closed position. In the closed position of canopy 310, platform 340 may be unexposed (e.g., covered, enclosed, inaccessible, obstructed) such that drone 10 may be retained on platform 340. A drone may be physically prevented from exiting or entering drone bay 330 in accordance with a closed position of canopy 310. Platform 340 may not be visible external drone bay 330 in accordance with the closed position of canopy 310.

Alternately or additionally in the storing state of drone pod 300, platform 340 may be disposed in a lowered position. In accordance with the lowered position, a depth to which platform 340 may be disposed in drone bay 330 may be increased relative to a raised position of platform 340. In the lowered position, a spacing between platform 340 and canopy 310 may be increased relative to a raised position of platform 340. The spacing between platform 340 and canopy 310 in the lowered position may be greater than a height of drone 310. In the storing state, platform 340 may be spaced apart from canopy 310 in accordance with the lowered position, but aligned with canopy 310 (e.g., aligned in a vertical direction) in accordance with the closed position of canopy 310. In the lowered position, platform 340 may be increasingly obstructed by one or more walls of drone bay 330 compared to the raised position of platform 340. A range of directions from which platform 340 may receive drone 10 may be decreased relative in comparison with a raised position of platform. In various embodiments in which platform 340 is non-moveable, a storing state may include canopy 310 in a closed position.

In embodiments, canopy 310 may move from an open position to a closed position, such as the position illustrated for canopy 110 of drone pod 100 (with brief reference to FIG. 1) and platform 340 may move from a raised position to a lowered position, such as the position illustrated for platform 240 of drone pod 200, thereby transitioning drone pod 300 from a receiving and/or presenting state to a storing state. Drone 10 may be disposed on platform 340 while platform 340 is moved between the raised position and the lowered position. Drone 10 may further be disposed on platform 340 while canopy 310 is moved between the open position and the closed position.

Drone pod 300 may be configured to prevent a crash condition between canopy 310, platform 340, and drone 10. A crash condition may exist when platform 340 is in a raised position and canopy 310 is closed position. It may be beneficial to detect a position of canopy 310 and/or platform 340 to prevent damage to drone pod 300 and/or a present item.

In various embodiments, drone pod 300 may include one or more sensors configured to detect a position of canopy 310 and/or platform 340. A sensor may be passive or active. A sensor may include a positional sensor. A positional sensor may include a limit switch (e.g., plunger, hinge lever, roller lever, etc.), an optical position sensor, a magnetic position sensor, and the like. A positional sensor may be configured to detect positional information of platform 340 and/or canopy 310. A control interface may receive the positional information detected by the positional sensor. The control interface may be configured to use the positional information detected by the positional sensor to prevent the crash condition between canopy 310, platform 340, and drone 10. To prevent the crash condition, a control interface may prevent platform 340 from moving from a lowered position to a raised position when a positional sensor detects canopy 310 in a closed position. To prevent the crash condition, a control interface may prevent canopy 310 from moving from an open position to a closed position when a positional sensor detects platform 340 in a raised position. In embodiments, platform 340 may be prevented from moving from the lowered position to the raised position until after canopy 310 has moved from the closed position to the open position.

In various embodiments, drone pod 300 may include one or more mechanical linkages to prevent the crash condition as described above. A mechanical linkage may mechanically link movement of canopy 310 relative to platform 340. A mechanical linkage may prevent canopy 310 from moving from an open position to a closed position when platform 340 is in a raised position. A mechanical linkage may prevent platform 340 from moving from a lowered position to a raised position while canopy 310 is in a closed position.

In various embodiments, drone bay 330 may comprise one or more mechanical and/or electromechanical locators for locating drone 10 relative to drone bay 330, such as locator 347 and locator 348. Locator 347 and locator 348 may be similar to, or have similar aspects and/or components with, the locators previously discussed herein. Locator 347 and locator 348 may be configured to engage one or more components of drone 10 (e.g., landing surface, rotor, body, arm, etc.) to locate and/or releasably retain drone 10 in drone bay 330. For example, locator 347 and locator 348 may each comprise an electromagnet configured to locate and retain drone 10 relative to drone bay 330 when energized.

In various embodiments, a drone pod for receiving, storing, and presenting a drone may configured to be freestanding or be configured to mount to a surface, such as a surface of a vehicle (e.g., roof, fuselage, hull, etc.), a surface of a permanent structure (e.g., a floor, wall, ceiling, etc.), and the like. The drone pod may include one or more structures configured to support the drone pod and/or couple the drone pod to a surface. The drone pod may include one or more aerodynamic structures to decrease the aerodynamic resistance of the drone pod, improve stability of the pod, provide a downward force on the canopy of the pod, or any combination thereof.

Figure 4:
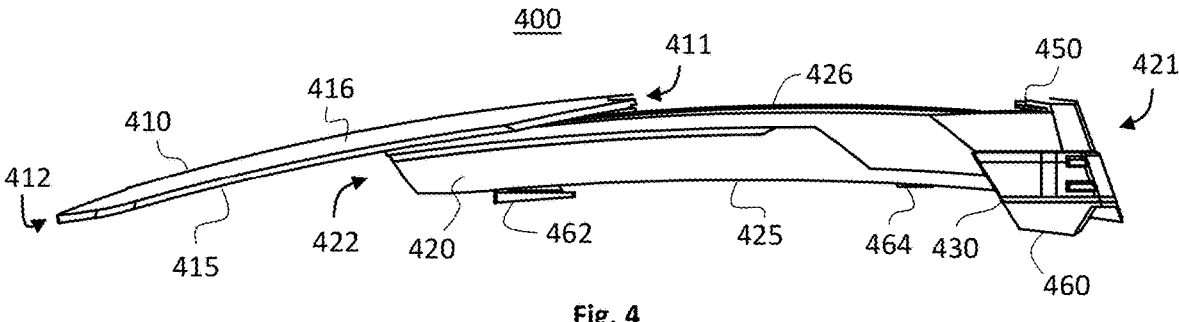
FIG. 4 illustrates a side view of a drone pod in accordance with various embodiments disclosed herein.

As illustrated in FIG. 4, a drone pod 400 for receiving, storing, and presenting a drone may include a canopy 410, a housing 420, a first foot 460, a second foot 462, and a rest 464. In embodiments, drone pod 400 may correspond to drone pod 100, 200, and/or 300 (FIGS. 1-3). Components of drone pod 400 may include features for mounting drone pod 400 to a provided surface. In various embodiments, drone pod 400 may be mounted to a surface of a vehicle and components of drone pod 400 may include aerodynamic structures.

Canopy 410 may comprise one or more inner surfaces, such as inner surface 415, and one or more outer surfaces, such as outer surface 416, each extending from a proximal end 411 to a distal end 412 of canopy 410. The shape of the canopy 410 may include portions that are flat, concave, convex, or any combination thereof. The shape of canopy 410 may be streamlined to minimize a coefficient of drag. Aerodynamic structures may be disposed on outer surface 416 of canopy 410. Aerodynamic structures may reduce drag, improve stability, and/or provide a downward force on canopy 410 to secure canopy 410 to housing 420. Aerodynamic structures may include features such as periodic surface dimpling, air dams, spoilers, fairings, and the like. For example, drone pod 400 may include a fairing 450 positioned at a fore end 421 of housing 420. Fairing 450 may be configured to engage proximal end 411 of canopy 410 in a closed position. Fairing 450 may be configured to provide a downward force on canopy 410 by directing air downward onto outer surface 416 of canopy 410. Fairing 450 may be configured to engage proximal end 411 of canopy 410 in a closed position, thereby preventing canopy 410 from disengaging housing 420 in a closed position.

Housing 420 may comprise one or more bottom surfaces, such as bottom surface 425, and one or more top surfaces, such as top surface 426, each extending from a fore end 421 to an aft end 422 of housing 420. The shape of top surface 426 may include portions that are flat, concave, convex, or any combination thereof. The shape of top surface 426 may complement the shape of canopy 410 and/or the shape of inner surface 415 of canopy 410 to facilitate movement between canopy 410 and housing 420. The shape of bottom surface 425 may include portions that are flat, concave, convex, or any combination thereof. The shape of the bottom surface 425 may be similar to a shape of a surface to which housing 420 may be mounted. For example, bottom surface 425 may comprise an incurvate shape, which complements an incurvate shape of a surface to which housing 420 may be mounted. A curvature of bottom surface 425 may generally follow a curvature of a vehicle surface to which drone pod 400 may be mounted. As another example, bottom surface 425 may comprise one or more conformable portions that may conform to a surface to which the drone pod may be mounted.

Drone pod 400 may include one or more structures for supporting and/or mounting drone pod 400 to a provided surface, such as first foot 460, second foot 462, and a rest 464. First foot 460 may be disposed proximal to fore end 421 of housing 420. First foot 460 may be coupled to bottom surface 425 of housing 420 or a bottom surface of a base 430. Second foot 462 may be disposed proximal to aft end 422 of housing 420. Second foot 462 may be coupled to bottom surface 425 of housing 420. The first foot 460 and the second foot 462 may include mechanical features for mounting to a provided surface, such as flanges, thru-holes, clamps, and the like. Drone pod 400 may be mounted to a surface via coupling methods such as welding, fastening, clamping, adhesion, etc. First foot 460 and second foot 462 may be configured to mount to a roof rack, a rain gutter, a fixed mounting point, a factory track and/or a raised rail of a vehicle. Rest 464 may be configured to distribute the weight of drone pod 400 over a greater surface area. Rest 464 may be disposed between first foot 460 and second foot 462. Rest 464 may be coupled to bottom surface 425 of housing 420. First foot 460, second foot 462, and rest 464 may be formed of one or more rigid, durable materials as previously described herein. First foot 460, second foot 462, and rest 464 may further comprise comfortable portions distal to bottom surface 425 of housing 420. The conformable portions may be configured to prevent damage to an external surface, provide dampening, or any combinations thereof.

The exterior surfaces of drone pod 400 may be smooth. A smooth surface may be conducive to removal of dirt and debris, decreased aerodynamic resistance, and/or engagement of moving parts. Aerodynamic features may be disposed on the exterior surfaces of drone pod 400 to reduce drag, improve stability, and/or provide a downward force on canopy 410 to secure canopy 410 to housing 420. The exterior surfaces of drone pod may be painted, coated, hardened, or otherwise treated. The exterior surfaces of drone pod 400 may include photovoltaic cells for providing power to drone pod 400.

Figure 5:
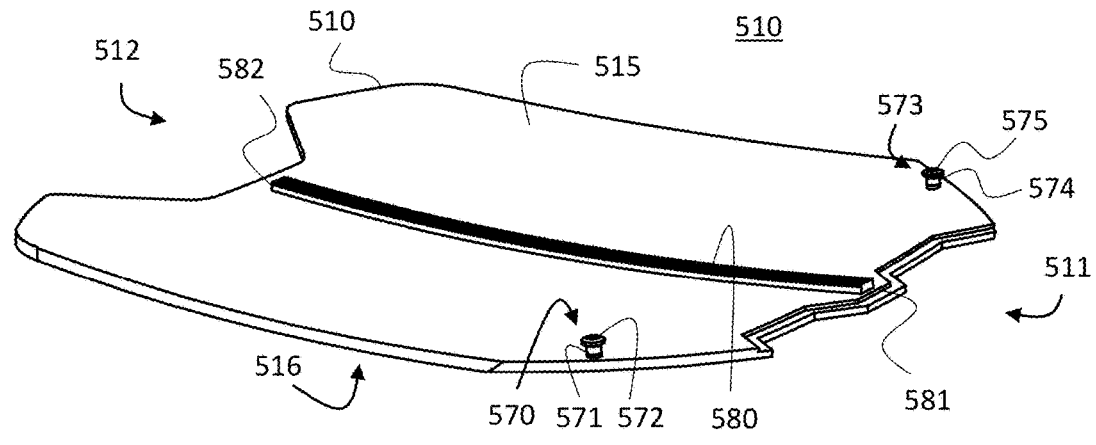
FIG. 5 illustrates a perspective view of a canopy in accordance with various embodiments disclosed herein.
Figure 5:

In various embodiments, a canopy of a drone pod for receiving, storing, and presenting a drone may comprise one or more components for movably coupling with a housing. In various embodiments and with reference to FIG. 5, a canopy 510 is disclosed. Canopy 510 may be similar to, or have similar aspects and/or components with, the canopies previously discussed herein. It should be understood by one skilled in the art that FIG. 5 is an example illustration of canopy 510, and one or more of the components of canopy 510 may be located in any suitable position within, or external to, canopy 510. In embodiments, canopy 510 may correspond to canopy 110, 210, 310, or 410 with brief reference to FIGS. 1-4.

Canopy 510 may include various components configured to movably engage canopy 510 with a housing of a drone pod for receiving, storing, and presenting a drone. In various embodiments, canopy 510 may include one or more glide studs (e.g., shoulder bolts, t-slot nuts, etc.) configured to constrain movement of canopy 510 relative to a housing of a drone pod. The glide studs may each be configured to slidably engage a guide (e.g., channel, track, slot, etc.), wherein the shape of the guide is configured to limit (e.g., constrain) the movement of the glide stud. For example, canopy 510 may include a first stud, such as first glide stud 570 and a second stud, such as second glide stud 573. First glide stud 570 may be positioned proximal to a fore end 511 of canopy 510. First glide stud 570 may include a first glide stud proximal portion 571 and a first glide stud distal portion 572. The first glide stud proximal portion 571 may generally comprise the shape of a shaft. First glide stud proximal portion 571 may be abutting an inner surface 515 of canopy 510. First glide stud proximal portion 571 may be coupled to canopy 510 via a fastener, weld, adhesive, etc. The first glide stud distal portion 572 may be configured to engage with an undercut of a glide stud guide as discussed further herein. The first glide stud distal portion 572 may include a shape having a larger diameter than a diameter of the first glide stud proximal portion 571.

Second glide stud 573 may be positioned proximal to fore end 511 of canopy 510. The shape of canopy 510 may have bilateral symmetry about a symmetry plane that bisects an aft end 512 and fore end 511 of canopy 510, such that second glide stud 573 is symmetric with first glide stud 570 about the symmetry plane. Second glide stud 573 may include a second glide stud proximal portion 574 and a second glide stud distal portion 575. The second glide stud proximal portion 574 may generally comprise the shape of a shaft. Second glide stud proximal portion 574 may be abutting an inner surface 515 of canopy 510. Second glide stud proximal portion 574 may be coupled to canopy 510 via a fastener, weld, adhesive, etc. The second glide stud distal portion 575 may be configured to engage with an undercut of a glide stud guide as discussed further herein. The second glide stud distal portion 575 may include a shape having a larger diameter than a diameter of the second glide stud proximal portion 574.

First glide stud 570, and second glide stud 573 may be configured to constrain movement of canopy 510 relative to housing 520. First glide stud 570 and second glide stud 573 may each be configured to engage a respective glide stud guide as discussed further herein, thereby preventing canopy 510 from disengaging a housing. First glide stud 570 and second glide stud 573 may each be configured to glide along a respective glide stud guide. First glide stud 570 and second glide stud 573 may be formed of a rigid, durable material as previously described herein.

In various embodiments, canopy 510 may be coupled to an actuator for moving canopy 510 relative to a housing. For example, a piston actuator (e.g., hydraulic piston actuator, pneumatic piston actuator, etc.) may be coupled to inner surface 515 of canopy 510. As another example, canopy may include a component of an actuator, such as a gear rack of a rack and pinion actuator.

In various embodiments, canopy 510 may include a gear rack 580. Gear rack 580 may longitudinally extend between a first gear rack end 581 and a second gear rack end 582. Gear rack 580 may longitudinally extend along a central region of canopy 510. Gear rack 580 may be centered on canopy 510, disposed along a symmetry plane that bisects an aft end 512 and fore end 511 of canopy 510. A length of the gear rack may be a longest dimension between first gear rack end 581 and second gear rack end 582 of gear rack 580. The length between first gear rack end 581, and second gear rack end 582 of gear rack 580 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. The length between first gear rack end 581 and second gear rack end 582 of gear rack 580 may be less than or equal to a length of the canopy. In embodiments, a length of gear rack 580 may be at least half, or at least two-third a length of canopy 510. A range of motion of the canopy relative to a housing may be determined by a length of gear rack 580. A maximum range of powered motion of the canopy relative to a housing may be determined by a length of gear rack 580.

Gear rack 580 may be congruent with inner surface 515 of canopy 510. In various embodiments, canopy 510 may have an incurvate shape. Gear rack 580 may be a curved gear rack, wherein a curvature of the gear rack complements a curvature of inner surface 515 of canopy 510. A radius of the curvature of the gear rack may be at least 80 inches (203 centimeters), at least 120 inches (305 centimeters), or at least 200 inches (508 centimeters).

Gear rack 580 may be coupled to canopy 510 via fasteners, adhesives, welds, and the like. Gear rack 580 may be formed of a rigid, durable material as previously described herein.

Canopy 510 may be configured to engage various components of a housing. In various embodiments, a housing may comprise various mechanical, electronic, and electrical components configured to aid in performing the functions of a drone pod. For example, a housing may comprise one or more guides, actuators, channels, control interfaces, wiring harnesses, and/or power sources for performing the functions of a drone pod.

Figure 6:
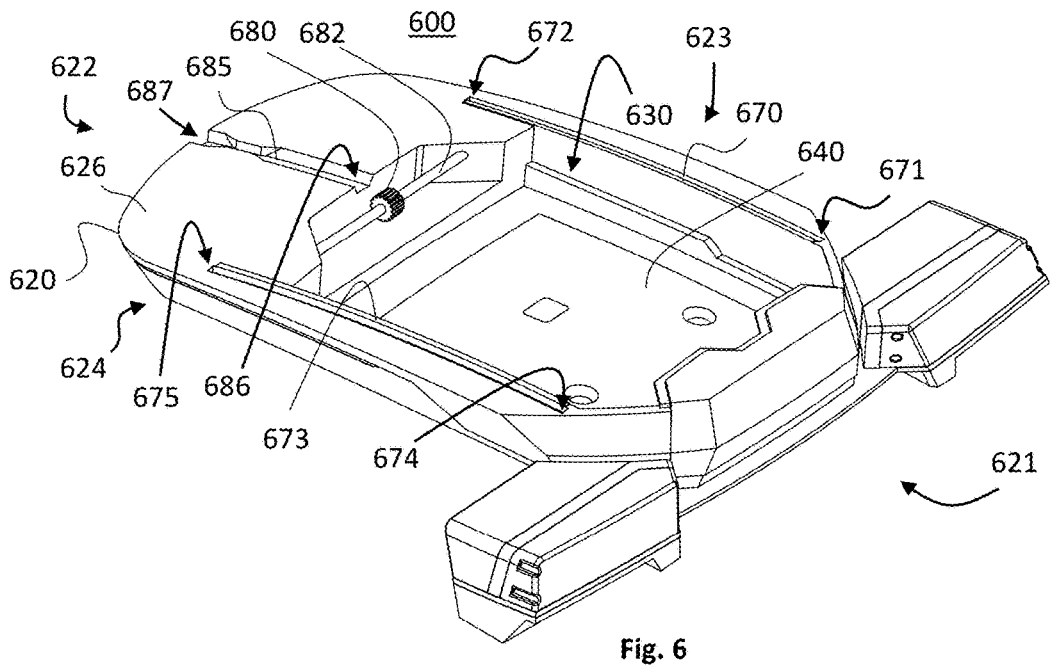
FIG. 6 illustrates a perspective view of a housing in accordance with various embodiments disclosed herein.

In the example of FIG. 6, housing 620 of drone pod 600 may extend from a fore end 621 to an aft end 622 between a first side 623 opposite a second side 624. A widest dimension of housing 620 may be a width between first side 623 and second side 624. The width between first side 623 and second side 624 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. Housing 620 may comprise one or more guides (e.g., tracks, channels, grooves, etc.) for constraining movement of a canopy relative to the housing. The one or more guides may be configured to slidably engage one or more glide studs disposed on the canopy, thereby constraining movement of the canopy relative to the housing. The one or more guides may extend along a direction of movement of a canopy relative to the housing. The one or more guides may include a shape generally in the form of a beam. The one or more guides may include a generally U-profile cross-section. In various embodiments, the one or more guides may comprise an undercut geometry, such as a dovetail, for engaging a first glide stud distal portion 572 and a second glide stud distal portion 575 (with brief reference to FIG. 5).

In various embodiments, housing 620 may comprise a first guide, such as a first glide stud guide 670 and a second guide, such as second glide stud guide 673 each for movably engaging a respective glide stud of a canopy as discussed previously herein. The first glide stud guide 670 may longitudinally extend from a first end 671 to a second end 672 between fore end 621 and aft end 622 of housing 620. A length of first glide stud guide 670 may be a longest dimension between first end 671 and second end 672 of first glide stud guide 670. The length of first glide stud guide 670 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. The length of first glide stud guide 670 may be less than a length of housing 620. The length of first glide stud guide 670 may define a maximum range of motion for a canopy movably coupled with housing 620. A widest dimension of first glide stud guide 670 may be a width between a first side and a second side opposite a first side of first glide stud guide 670. The width of first glide stud guide 670 may be at least 0.30 inches (0.76 centimeters), at least 0.5 inches (1.27 centimeters), at least 0.75 inches (1.91 centimeters), or at least 1 inch (2.54 centimeters) in embodiments according to various aspects of the present disclosure.

The second glide stud guide 673 may longitudinally extend from a first end 674 to a second end 675 between fore end 621 and aft end 622 of housing 620. A length of second glide stud guide 673 may be a longest dimension between first end 674 and second end 675 of second glide stud guide 673. The length of second glide stud guide 673 may be at least twelve inches (thirty centimeters), eighteen inches (forty-six centimeters), at least twenty-four inches (sixty-one centimeters), at least thirty-six inches (ninety-one centimeters), or at least forty-eight inches (one hundred and twenty-two centimeters) in embodiments according to various aspects of the present disclosure. The length of second glide stud guide 673 may be less than a length of housing 620. The length of second glide stud guide 673 may define a maximum range of motion for a canopy movably coupled with housing 620. The length of second glide stud guide 673 may be equal to the length of first glide stud guide 670. A widest dimension of second glide stud guide 673 may be a width between a first side and a second side opposite a first side of second glide stud guide 673. The width of second glide stud guide 673 may be at least 0.30 inches (0.76 centimeters), at least 0.5 inches (1.27 centimeters), at least 0.75 inches (1.91 centimeters), or at least 1 inch (2.54 centimeters) in embodiments according to various aspects of the present disclosure. The width of second glide stud guide 673 may be the same as the width of first glide stud guide 670. Second glide stud guide 673 may comprise a similar shape to first glide stud guide 670. The shape of housing 620 may have bilateral symmetry about a symmetry plane that bisects aft end 622 and fore end 621 of housing 620, such that second glide stud guide 673 is symmetric with first glide stud guide 670 about the symmetry plane.

Housing 620 may comprise a first actuator and/or a component of a first actuator for movably coupling a canopy to the housing. For example, housing 620 may comprise a piston actuator (e.g., hydraulic piston, pneumatic piston, etc.), a piezoelectric actuator, or an electromechanical actuator. As another example, housing 620 may comprise a pinion of a rack and pinion actuator. Housing 620 may comprise a pinion 680 configured to drive a rack, such as gear rack 580 (with brief reference to FIG. 5). Pinion 680 may be coupled to a shaft 682 extending along an axis of rotation of pinion 680. Pinion 680 and shaft 682 may be disposed proximal to aft end 622 of housing 620. Pinion 680 and shaft 682 may be disposed within a portion of a drone bay 630. Pinion 680 may be recessed within drone bay 630, to minimize a relative height of pinion 680.

In embodiments, housing 620 may include a single pinion 680 configured to moveably couple a canopy to housing 620. The pinion 680 may centered on housing 620 between a first side 623 and a second side 624. The pinion 680 may be moveably coupled along a center of the canopy, thereby enabling pinion 680 to evenly apply a force to the canopy to move the canopy between a first position and a second position. For example, pinion 680 may mesh with a gear rack disposed along a plane that bisects a fore end and aft end of the canopy. Pinion 680 may selectively drive a gear rack of the canopy toward aft end 622 of housing 620, thereby moving the canopy toward aft end 622 and exposing drone bay 630. Pinion 680 may further selectively drive the same gear rack of the canopy toward fore end 621 of housing 620, thereby moving the canopy toward fore end 621 and enclosing drone bay 630. Driving the gear rack toward the aft end 622 may include rotating pinion 680 in a first rotational direction and driving the gear rack toward the fore end 620 may include rotating pinion 680 in a second rotational direction, different from the first rotational direction.

Housing 620 may further comprise components for driving rotation of pinion 680 and shaft 682. For example, housing 620 may also include a motor, gearbox, etc. A control interface may control rotation of pinion 680. Actuation of the first actuator may cause a glide stud of a canopy to traverse first glide stud guide 670 of housing 620 in a first direction and a second glide stud of a canopy to traverse second glide stud guide 673 of housing 620 in the first direction. Actuating the first actuator may cause a first glide stud of a canopy to traverse first glide stud guide 670 of housing 620 in a second direction opposite the first direction and a second glide stud of a canopy to traverse second glide stud guide 673 of housing 620 in the second direction.

The housing may further comprise a relief (e.g., channel, groove, track, etc.) longitudinally extending from aft end 622 of housing and terminating proximal to pinion 680 of housing 620. For example, housing 620 may include a gear rack channel 685 extending from an engagement end 686 to a free end 687. The engagement end 686 may be proximal to pinion 680. The dimensions of gear rack channel 685 may be equal to or greater than the dimensions a gear rack, such as gear rack 580 (with brief reference to FIG. 5) to allow a gear rack to move about gear rack channel 685. Gear rack channel 685 may provide a recess for a gear rack of a canopy to move within. In various embodiments, gear rack channel 685 may enable a canopy to be flush with a top surface 626 of housing 620. A canopy flush with top surface 626 of housing 620 may improve weather sealing of a drone pod. In various embodiments, a drone pod may include components such as seals, gaskets, etc. for weather sealing. Top surface 626 may provide support for a canopy.

Housing 620 may comprise a second actuator for actuating a platform 640. The second actuator may comprise one or more elements of an actuator previously described. The second actuator may be electrically, electronically, and/or electronically coupled with the control interface. The second actuator may moveable coupled platform 640 to housing 620. The second actuator may raise and lower platform 640 relative to housing 620. The second actuator may raise platform 640 relative to a floor of bay 630. The second actuator may lower platform 640 relative to an opening of bay 630.

In embodiments, platform 640 may be configured to raise and lower by a predetermined distance to minimize a likelihood of collision between a drone and a wall of drone bay 630. In order to minimize a height of housing 620, the distance by which platform 640 may be raised and lowered may be greater, equal, or substantially equal (e.g., a difference of less than two inches) to a height of a wall from which bay 630 is formed. The distance may extend from a floor of bay 630 to a height at which platform 640 is co-planar with housing 620 or at which platform 640 is positioned above housing 620. The distance may include at least seventy-five percent of a height of bay 630 or at least ninety percent of a height of bay 630. In embodiments, the distance may be equal or greater than a height of a drone for which drone pod 600 is configured to receive, including when canopy 610 is disposed in a closed position to enclose the drone within bay 620. The distance may be selected to provide clearance for a drone received in the bay 630 yet retain a compact overall height for drone pod 600.

In various embodiments, a system for receiving, storing (e.g., stowing), and presenting (e.g., launching) a drone may comprise a drone and a drone pod as discussed herein. For example, a system for receiving, stowing, and launching a drone may comprise drone 10 and one or more features or elements of drone pod 100, 200, 300, 400, and/or 600 (FIGS. 1-4, 6).

Aspects of the present disclosure may relate to a drone pod for receiving, storing, and presenting a provided drone.

A first example embodiment of a drone pod may comprise a housing including a drone bay, a first actuator, a second actuator, and a platform movably coupled to the housing by the second actuator where the platform is moveably coupled between a raised position relative to a floor of the drone bay and a lowered position relative to the raised position. The drone pod may comprise a canopy moveably coupled to the housing by the first actuator, where the canopy is coupled between an open position in which the drone bay is exposed and a closed position in which the drone bay is enclosed. The housing may be configured to receive and present the provided drone when the platform is movably coupled in the raised position and the canopy is moveably coupled in the open position, and the housing may be configured to store the provided drone in the drone bay when the platform is movably coupled in the lowered position and the canopy is moveably coupled in the closed position.

A second example embodiment of a drone pod may comprise a canopy extending from a first end to a second end, where the canopy comprises an inner surface and a gear rack congruent with and coupled to the inner surface of the canopy, and where the gear rack longitudinally extends between the first end of the canopy and the second end of the canopy. The drone pod may comprise a housing extending from an aft end to a fore end, where the housing comprises a drone bay and a pinion meshed with the gear rack of the canopy, where the pinion is configured to drive the gear rack toward the aft end of the housing to move the canopy toward the aft end of the housing and expose the drone bay, and where the pinion is configured to drive the gear rack toward the fore end of the housing to move the canopy toward the fore end of the housing and enclose the drone bay.

A third example embodiment of a drone pod may include the drone pod of any of the preceding example embodiments where the platform includes a locator for locating the provided drone relative to the platform.

A fourth example embodiment of a drone pod may include the drone pod of any of the preceding example embodiments where the base is coupled to a fore end of the housing, and where the base includes at least one foot for coupling to a provided vehicle surface.

A fifth example embodiment of a drone pod may include the drone pod of any of the preceding example embodiments where the base includes a light bar configured to provide visible indicia.

A sixth example embodiment of a drone pod may include the drone pod of any of the preceding example embodiments further comprising a window at a fore end of the housing, where the window communicatively couples the drone bay with a portion of infrared radiation external to the drone bay, and where the infrared radiation includes a range of wavelengths between eight microns and fifteen microns.

A seventh example embodiment of a drone pod may include the drone pod of any of the preceding example embodiments where the housing further comprises a gear rack channel longitudinally extending from a free end to an engagement end between the aft end of the housing and the drone bay, and where the gear rack channel is configured to receive the gear rack.

An eighth example embodiment of a drone pod may include the drone pod of any of the preceding example embodiments where the pinion is proximate to the engagement end of the gear rack channel.

A ninth example embodiment of a drone pod may include the drone pod of any of the preceding example embodiments where the housing further comprises a glide stud guide longitudinally extending between the aft end of the housing and the fore end of the housing, where the canopy further comprises a glide stud protruding from the inner surface of the canopy, and where the glide stud is slidably engaged with the glide stud guide of the housing.

A tenth example embodiment of a drone pod may include the drone pod of any of the preceding example embodiments where one of a length of the gear rack and a length of the glide stud guide defines a maximum range of motion of the canopy relative to the housing.

An eleventh example embodiment of a drone pod may include the drone pod of any of the preceding example embodiments where the drone bay comprises a platform having at least one locator for locating a provided drone relative to the platform.

A twelfth example embodiment of a drone pod may include the drone pod of any of the preceding example embodiments where the platform is movably coupled to the housing via an actuator configured to raise and lower the platform relative to the housing.

A thirteenth example embodiment of a drone pod may include the drone pod of any of the preceding example embodiments where the canopy comprises a concave shape.

A fourteenth example embodiment of a drone pod may include the drone pod of any of the preceding example embodiments where the housing comprises a fairing positioned at the fore end of the housing, and where the fairing is configured to provide a downward force on an outer surface of the canopy.

A fifteenth example embodiment of a drone pod may include the drone pod of any of the preceding example embodiments where a portion of the fore end of the housing comprises a window contiguous with the drone bay, and where the window communicatively couples the drone bay with a portion of infrared radiation external to the drone bay.

A sixteenth example embodiment of a drone pod may include the drone pod of any of the preceding example embodiments comprising a forward foot positioned under the fore end of the housing and a rearward foot positioned under the aft end of the housing, where the forward foot and the rearward foot are each configured to support the housing.

A seventeenth example embodiment of a drone pod may include the drone pod of any of the preceding example embodiments where the base includes a light bar configured to provide visible indicia.

Aspects of the present disclosure may relate to a system for receiving, stowing, and launching drones. A first example embodiment of a system for receiving, storing, and launching drones may comprise a drone, and a drone pod. The drone pod may comprise a housing, a canopy movably coupled to the housing, platform movably coupled to the housing, and a drone bay, where the drone pod is configured to move the canopy to expose the drone bay and raise the platform relative to a floor of the drone bay to receive the drone, lower the platform toward the floor and move the canopy to enclose the drone bay to stow the drone, and move the canopy to expose the drone bay and raise the platform relative to the floor of the drone bay to launch the drone.

A second example embodiment of a system for receiving, stowing, and launching drones may include the system of the preceding example embodiment where the platform comprises one or more locators for locating the drone relative to the platform.

A second example embodiment of a system for receiving, stowing, and launching drones may include the system of any of the preceding example embodiments where the drone pod comprises a window communicatively coupling the drone bay with a portion of infrared radiation external to the drone bay, and where the portion including a wavelength between eight microns and fifteen microns.

A third example embodiment of a system for receiving, stowing, and launching drones may include the system of any of the preceding example embodiments where the drone pod comprises one or more feet for mounting to a provided vehicle surface.

A fourth example embodiment of a system for receiving, stowing, and launching drones may include the system of any of the preceding example embodiments where the drone pod comprises a light bar configured to provide indicia.

A fifth example embodiment of a system for receiving, stowing, and launching drones may include the system of any of the preceding example embodiments where the canopy comprises a gear rack and a glide stud, the housing includes a pinion and a glide stud guide, and the pinion is configured to movably engage the gear rack of the canopy to drive movement of the canopy relative to the housing and the glide stud guide is configured to movably engage the glide stud of the canopy to prevent disengagement of the canopy relative to the housing.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words "comprising," "comprises," "including," "includes," "having," and "has" introduce an open-ended statement of component structures and/or functions. In the specification and claims, the words "a" and "an" are used as indefinite articles meaning "one or more". While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". A person of ordinary skill in the art will appreciate that this disclosure includes any practical combination of the structures and methods disclosed. While for the sake of clarity of description several specifics embodiments of the invention have been described, the scope of the invention is intended to be measured by the claims as set forth below.

What is claimed is:

1. A drone pod for receiving, storing, and presenting a provided drone, the drone pod comprising:
   a housing including:
      a drone bay;
      a first actuator;
      a second actuator; and
      a platform movably coupled to the housing by the second actuator, the platform moveably coupled between a raised position relative to a floor of the drone bay and a lowered position relative to the raised position; and
   a canopy moveably coupled to the housing by the first actuator, the canopy moveably coupled between an open position in which the drone bay is exposed and a closed position in which the drone bay is enclosed, wherein:

the housing is configured to receive and present the provided drone when the platform is movably coupled in the raised position and the canopy is moveably coupled in the open position; and
   the housing is configured to store the provided drone in the drone bay when the platform is movably coupled in the lowered position and the canopy is moveably coupled in the closed position.

2. The drone pod of claim 1 wherein the platform includes a locator for locating the provided drone relative to the platform.

3. The drone pod of claim 1 comprising a window at a fore end of the housing, wherein the window communicatively couples the drone bay with a portion of infrared radiation external to the drone bay, the portion of infrared radiation including a range of wavelengths between eight microns and fifteen microns.

4. The drone pod of claim 1 comprising a base coupled to a fore end of the housing, the base including at least one foot for coupling to a provided vehicle surface.

5. The drone pod of claim 4 wherein the base includes a light bar configured to provide visible indicia.

6. A drone pod for receiving, storing, and presenting a provided drone, the drone pod comprising:
   a housing extending from an aft end to a fore end, the housing comprising:
      a drone bay;
      a pinion actuator; and
      a platform movably coupled to the housing by a second actuator, the platform moveably coupled between a raised position relative to a floor of the drone bay and a lowered position relative to the raised position; and
   a canopy extending from a first end to a second end, the canopy moveably coupled to the housing via at least the pinion actuator, wherein:
      the pinion actuator moves the canopy toward the aft end of the housing and expose the drone bay; and
      the pinion actuator moves the canopy toward the fore end of the housing and enclose the drone bay.

7. The drone pod of claim 6 wherein the canopy comprises a concave shape.

8. The drone pod of claim 6 wherein:
   the second actuator moves the platform to the raised position while the canopy exposes the drone bay to present the provided drone on the platform; and
   the second actuator moves the platform to the lowered position while the canopy encloses the drone bay.

9. The drone pod of claim 6 wherein:
   the second actuator moves the platform to the raised position while the canopy exposes the drone bay to receive the provided drone on the platform; and
   the second actuator moves the platform with the provided drone to the lowered position while the canopy encloses the drone bay.

10. The drone pod of claim 6 comprising a forward foot positioned under the fore end of the housing and a rearward foot positioned under the aft end of the housing, the forward foot and the rearward foot each configured to support the housing.

11. The drone pod of claim 6, wherein the pinion actuator is disposed proximal to the aft end of the housing.

12. The drone pod of claim 6, wherein:
   the housing comprises one or more glide stud guides that extend longitudinally between the fore end and the aft end of the housing; and the canopy comprises one or more glide studs configured to engage the one or more glide stud guides and glide along the one or more glide stud guides.

13. The drone pod of claim 12, wherein a length of the one or more glide stud guides defines a maximum range of motion of the canopy relative to the housing.

14. The drone pod of claim 6, wherein the drone bay comprises one or more locators, the one or more locators configured to engage one or more components of the provided drone and locate the provided drone relative to the drone bay.

15. The drone pod of claim 14, wherein the one or more locators apply a physical force to the provided drone and retain the provided drone on the platform.

16. The drone pod of claim 6, further comprising:

a first positional sensor that detects and provides an indication of a canopy position relative to the housing to a control interface of the drone pod; and a second positional sensor that detects and provides an additional indication of a platform position relative to the housing to the control interface.

17. The drone pod of claim 6 comprising a control interface located remotely from the housing and configured to:

control movement of the canopy relative to the housing via the pinion actuator; and control additional movement of the platform relative to the housing via the second actuator.

18. A method for receiving, storing, and presenting a provided drone via a drone pod attached to a vehicle comprising:

activating a first actuator that movably couples a canopy to a housing of the drone pod, the first actuator configured to move the canopy to a first position relative to the housing and expose a drone bay of the housing;

activating a second actuator that moveably couples a platform with the housing, the second actuator configured to raise the platform to a raised position relative to a floor of the drone bay;

receiving the provided drone while the platform is in the raised position;

activating the second actuator to lower the platform to a lowered position relative to the floor of the drone bay; and activating the first actuator to move the canopy to a second position to enclose the drone bay.

19. The method of claim 18 comprising preventing, by a positional switch associated with the canopy, the second actuator from raising the platform from the lowered position to the raised position while the canopy is in the second position enclosing the drone bay.

20. The method of claim 18 comprising preventing, by a positional switch associated with the platform, the first actuator from moving the canopy from the first position to the second position while the platform is in the raised position.

* * * * *